(12) United States Patent
Cho et al.

(10) Patent No.: US 8,724,581 B2
(45) Date of Patent: May 13, 2014

(54) METHOD OF ALLOCATING RESOURCES IN WIRELESS COMMUNICATION SYSTEMS

(75) Inventors: Han Gyu Cho, Anyang-si (KR); Ki Ho Nam, Anyang-si (KR); Seung Woo Nam, Anyang-si (KR); Jin Soo Choi, Anyang-si (KR); Jong Young Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 804 days.

(21) Appl. No.: 12/743,508

(22) PCT Filed: Dec. 5, 2008

(86) PCT No.: PCT/KR2008/007221
§ 371 (c)(1),
(2), (4) Date: May 18, 2010

(87) PCT Pub. No.: WO2009/072842
PCT Pub. Date: Jun. 11, 2009

(65) Prior Publication Data
US 2010/0254342 A1  Oct. 7, 2010

Related U.S. Application Data

(60) Provisional application No. 60/992,683, filed on Dec. 5, 2007, provisional application No. 61/012,454, filed on Dec. 9, 2007, provisional application No. 61/016,488, filed on Dec. 23, 2007.

(51) Int. Cl.
*H04W 4/00* (2009.01)
(52) U.S. Cl.
USPC .......................................... 370/330

(58) Field of Classification Search
CPC ..... H04W 4/06; H04W 1/0025; H04W 84/18; H04W 88/06; H04W 88/08; H04W 72/0446; H04W 72/0453; H04W 74/0816; H04W 74/04
USPC ......... 370/329, 330, 252, 254, 406, 478, 331, 370/312, 314, 326, 328, 336–337, 343, 345, 370/347–348
See application file for complete search history.

(56) References Cited

U.S. PATENT DOCUMENTS 6,275,506 B1 * 8/2001 Fazel et al. .................... 370/478
7,626,966 B1 * 12/2009 Ruiter et al. .................. 370/337

(Continued)

FOREIGN PATENT DOCUMENTS

| JP | 2007-243488 A | 9/2007 |
| KR | 10-2005-0110692 A | 11/2005 |
| KR | 10-2007-0073338 A | 7/2007 |

*Primary Examiner* — Kwang B Yao
*Assistant Examiner* — Syed M Bokhari
(74) *Attorney, Agent, or Firm* — McKenna Long & Aldridge LLP

(57) ABSTRACT

A method of allocating resources in a wireless communication system includes dividing an available frequency band on a logical plane into a distributed zone and a localized zone, dividing the distributed zone into a plurality of subparts in time domain, and dividing the distributed zone and the localized zone into a distributed zone and a localized zone on a physical plane. The plurality of subparts included in one distributed zone on the logical plane is mapped to a different distributed zone on the physical plane.

10 Claims, 19 Drawing Sheets

(56) References Cited

U.S. PATENT DOCUMENTS

| | | |
|---|---|---|
| 2007/0173198 A1 | 7/2007 | Kim et al. |
| 2008/0095071 A1* | 4/2008 | Lu et al. ........................ 370/254 |
| 2008/0192847 A1* | 8/2008 | Classon et al. ................ 375/260 |
| 2008/0279204 A1* | 11/2008 | Pratt et al. ..................... 370/406 |
| 2009/0092090 A1* | 4/2009 | Beems Hart et al. ......... 370/329 |
| 2010/0220683 A1* | 9/2010 | Novak et al. ................... 370/330 |
| 2010/0238902 A1* | 9/2010 | Ji et al. .......................... 370/331 |
| 2013/0034007 A1* | 2/2013 | Zhang et al. ................... 370/252 |

\* cited by examiner

Fig. 7
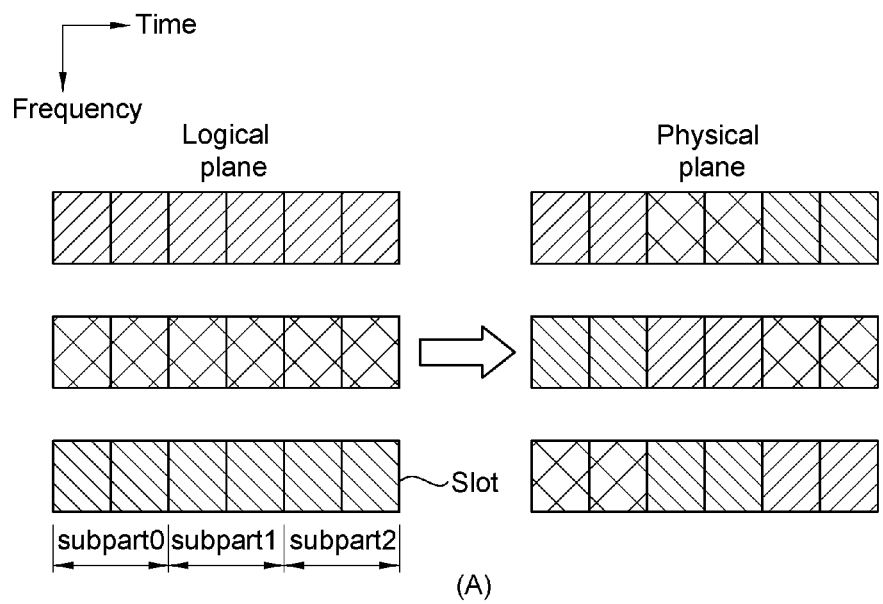
(A)
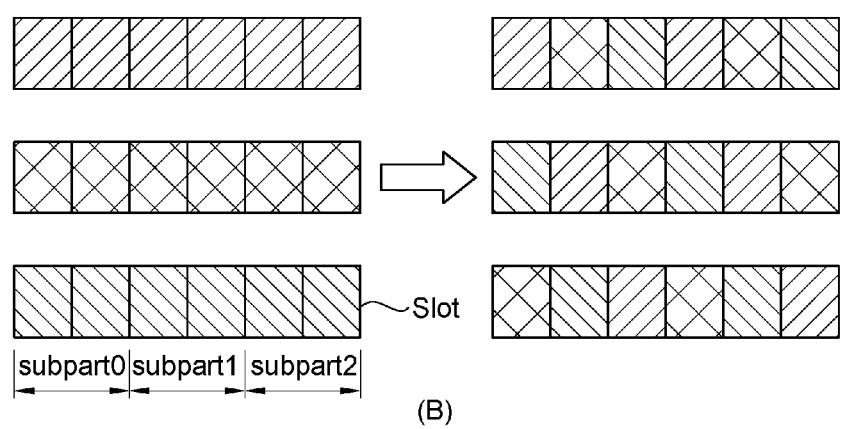
(B)

[Fig. 20]

METHOD OF ALLOCATING RESOURCES IN WIRELESS COMMUNICATION SYSTEMS

This application is a 35 U.S.C. §371 National Stage entry of International Application No. PCT/KR2008/007221, filed on Dec. 5, 2008, and claims priority to U.S. Provisional Application Nos. 60/992,683, filed Dec. 5, 2007, 61/012,454, filed Dec. 9, 2007, and 61/016,488, filed Dec. 23, 2007 each of which is hereby incorporated by reference in its entirety as if fully set forth herein.

TECHNICAL FIELD

The present invention relates to wireless communications, and more particularly, to a method and apparatus for allocating resources in a wireless communication system.

BACKGROUND ART

Wireless communication systems are widely spread all over the world to provide various types of communication services such as voice or data services. The wireless communication system is generally a multiple access system that can support communication with multiple users by sharing available radio resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. In the IEEE 802.16a standard approved in 2003, 'WirelessMAN-OFDM' and 'WirelessMAN-OFDMA' were further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'. A standard based on the IEEE 802.16-2004/Cor1 is referred to IEEE 802.16e or WiMAX.

In the IEEE 802.16 broadband wireless access working group, there is ongoing standardization effort for the IEEE 802.16m standard which is a new technical standard based on the IEEE 802.16e. The IEEE 802.16m standard requires flexible support for the conventional IEEE 802.16e standard as well as a new system.

In the IEEE 802.16e standard, in general, data is mapped to physical subcarriers in a physical layer according to two steps. In a first step, the data is mapped to at least one data slot on at least one logical subchannel. In a second step, each logical subchannel is mapped to a physical subcarrier. This is called permutation. Examples of a permutation rule introduced in the IEEE 802.16e standard include full usage of subchannels (FUSC), partial usage of subchannels (PUSC), optional-FUSC (O-FUSC), optional-PUSC (O-PUSC), adaptive modulation and coding (AMC), etc. A set of OFDM symbols using the same permutation rule is referred to as a permutation zone.

FIG. 1 shows a frame structure of the conventional IEEE 802.16 system. This may be found in the section 8.4.4.2 of the IEEE 802.16-2004 standard. An OFDMA frame includes a downlink (DL) frame and an uplink (UL) frame which are time-division duplexed. The DL frame temporally precedes the UL frame. The DL frame consists of a preamble and a plurality of permutation zones. The UL frame consists of a plurality of permutation zones.

In the conventional frame structure, the permutation zones are divided in a time domain. In addition, in the same time domain, the same permutation rule is applied to a full frequency domain. A base station (BS) can switch the permutation zones according to a channel condition reported from a user equipment (UE).

The above frame structure has the following problems.

First, since the same permutation rule has to be applied in one or a plurality of OFDM symbols, flexibility for resource allocation is not sufficient. In general, both users having high channel selectivity and users having high frequency diversity gain co-exist in a cell for a specific time period. It is preferable that the users having the high channel selectivity use the AMC. In addition, it is preferable that the users having the high frequency diversity gain use the FUSC. Therefore, the resource allocation flexibility is not sufficient to satisfy users having various channel conditions in the same time period.

Second, since resources are allocated in a subcarrier unit when using a permutation rule such as the FUSC, it is difficult to apply a space frequency block code (SFBC) scheme in which a plurality of subcarriers have to be grouped in pair.

Third, although the conventional structure is designed to minimize inter-cell interference when the same permutation zone is used at the same time point between cells, a probability that the same permutation zone is used at the same time point between the cells is actually not much high after a first permutation zone. Therefore, it is difficult to properly utilize advantages of the structure designed to minimize inter-cell interference between permutation zones.

DISCLOSURE OF INVENTION

Technical Problem

The present invention provides a method capable of flexible resource allocation.

The present invention also provides a method of allocating resources to reduce inter-cell interference.

Technical Solution

In an aspect, a method of allocating resources in a wireless communication system includes dividing an available frequency band on a logical plane into a distributed zone and a localized zone, dividing the distributed zone into a plurality of subparts in time domain, and dividing the distributed zone and the localized zone into a distributed zone and a localized zone on a physical plane, wherein the plurality of subparts included in one distributed zone on the logical plane is mapped to a different distributed zone on the physical plane.

The localized zone may be mapped to the same resource on the logical plane and the physical plane.

Each subpart may be mapped to a different distributed group on the physical plane, and the distributed group may include at least one distributed zone and at least one localized zone. The number of subparts may be equal to the number of distributed groups or be a multiple of the number of distributed groups.

In another aspect, an apparatus for wireless communication includes a transceiver for transmitting or receiving a radio signal according to an allocated resource, and a resource allocation unit configured to divide a slot on a logical plane into a plurality of subparts in time domain and map the slot throughout a plurality of slots on a physical plane, wherein each subpart included in the slot on the logical plane is mapped to a different slot on the physical plane.

Advantageous Effects

Since a localized zone and a distributed zone can co-exist in the same time period, resources can be flexibly allocated. In addition, inter-cell interference can be reduced using a cell-specific mapping rule.

BRIEF DESCRIPTION OF DRAWINGS

FIG. 7 is an exemplary diagram showing subpart separation.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Although the following description will focus on the IEEE 802.16m for clarity, the technical features of the present invention are not limited thereto.

Figure 1:
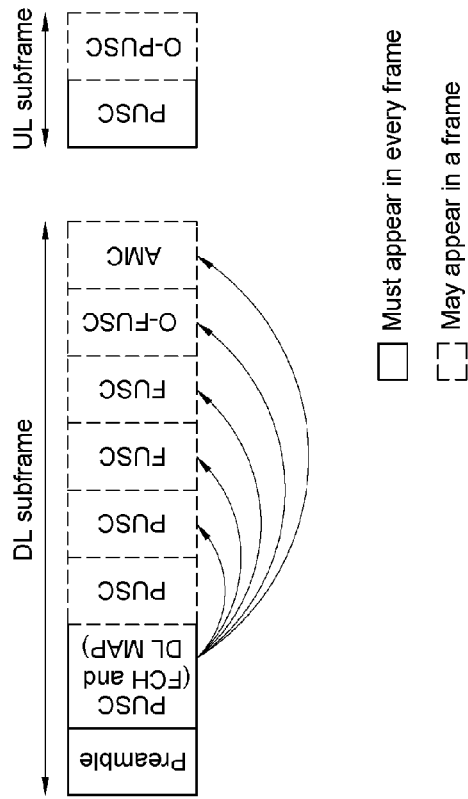
FIG. 1 shows a frame structure of the conventional institute of electrical and electronics engineers (IEEE) 802.16 system.
Figure 2:
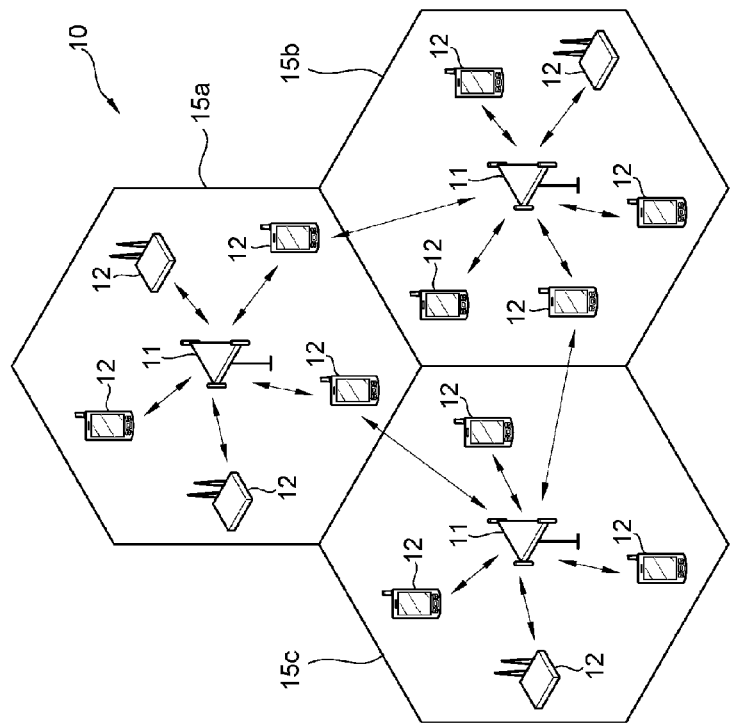
FIG. 2 shows a wireless communication system.

FIG. 2 shows a wireless communication system.

Referring to FIG. 2, a wireless communication system 10 includes at least one base station (BS) 11. The BSs 11 provide communication services to specific geographical regions (generally referred to as cells) 15a, 15b, and 15c. Each cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 3:
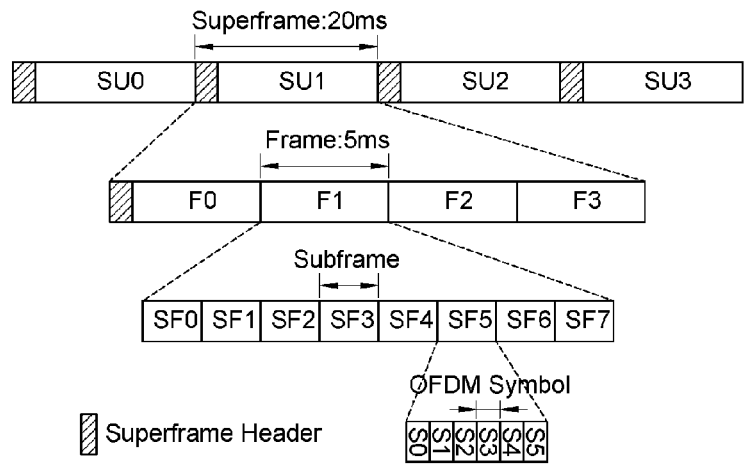
FIG. 3 shows an example of a frame structure.

FIG. 3 shows an example of a frame structure.

Referring to FIG. 3, a superframe includes a superframe header and four radio frames F0, F1, F2, and F3. Although it is shown that each superframe has a size of 20 milliseconds (ms) and each frame has a size of 5 ms, the present invention is not limited thereto. The superframe header may be located at a front-most position of the superframe. A common control channel is assigned to the superframe header. The common control channel is a channel used to transmit information regarding frames constituting the superframe or control information (e.g., system information) that can be commonly utilized by all UEs within a cell.

One frame includes 8 subframes SF0, SF1, SF2, SF3, SF4, SF5, SF6, and SF7. Each subframe can be used for UL or DL transmission. Each subframe may consist of 6 or 7 OFDM symbols, but this is for exemplary purposes only. Time division duplexing (TDD) or frequency division duplexing (FDD) may be applied to the frame. In the TDD, each subframe is used in UL or DL at the same frequency and at a different time. That is, subframes included in a TDD frame are divided into a UL subframe and a DL subframe in a time domain. In the FDD, each subframe is used in UL or DL at the same time and at a different frequency. That is, subframes included in an FDD frame are divided into a UL subframe and a DL subframe in a frequency domain. UL transmission and DL transmission occupy different frequency bands and can be simultaneously performed.

A subframe includes at least one frequency partition. The frequency partition consists of at least one physical resource unit (PRU). The frequency partition may include a localized PRU and/or a distributed PRU. The frequency partition may be used for other purposes such as fractional frequency reuse (FFR) or multicast or broadcast service (MBS).

The PRU is defined as a basic physical unit for allocating resources including a plurality of consecutive OFDM symbols and a plurality of consecutive subcarriers. The number of OFDM symbols included in the PRU may be equal to the number of OFDM symbols included in one subframe. For example, when one subframe consists of 6 OFDM symbols, the PRU may be defined with 18 subcarriers and 6 OFDM symbols. A localized resource unit (LRU) is a basic logical unit for distributed resource allocation and localized resource allocation. The LRU is defined with a plurality of OFDM symbols and a plurality of subcarriers, and includes pilots used in the PRU. Therefore, one LRU includes a specific number of subcarriers, where the specific number depends on the number of allocated pilots.

A logical distributed resource unit (DRU) may be used to obtain a frequency diversity gain. The DRU includes a distributed subcarrier group in one frequency partition. The DRU has the same size as the PRU. One subcarrier is a basic unit of constituting the DRU.

A logical contiguous resource unit (CRU) may be used to obtain a frequency selective scheduling gain. The CRU includes a localized subcarrier group. The CRU has the same size as the PRU.

Figure 4:
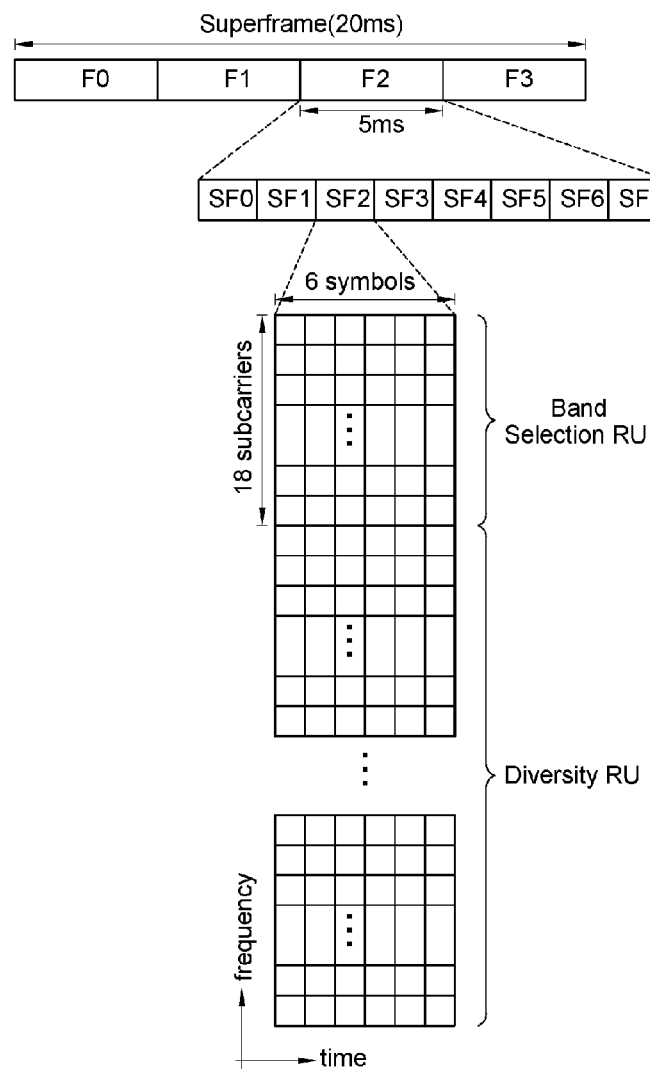
FIG. 4 shows an example of a subchannel structure.

FIG. 4 shows an example of a subchannel structure.

Referring to FIG. 4, a basic unit of a subchannel is a physical resource unit (PRU). For example, one PRU consists of 18 subcarriers ? 6 OFDM symbols. The subchannel may include at least one or more PRUs. The subchannel may have a structure in which a band selection PRU and a diversity PRU occupy different frequency bands in one subframe.

Figure 5:
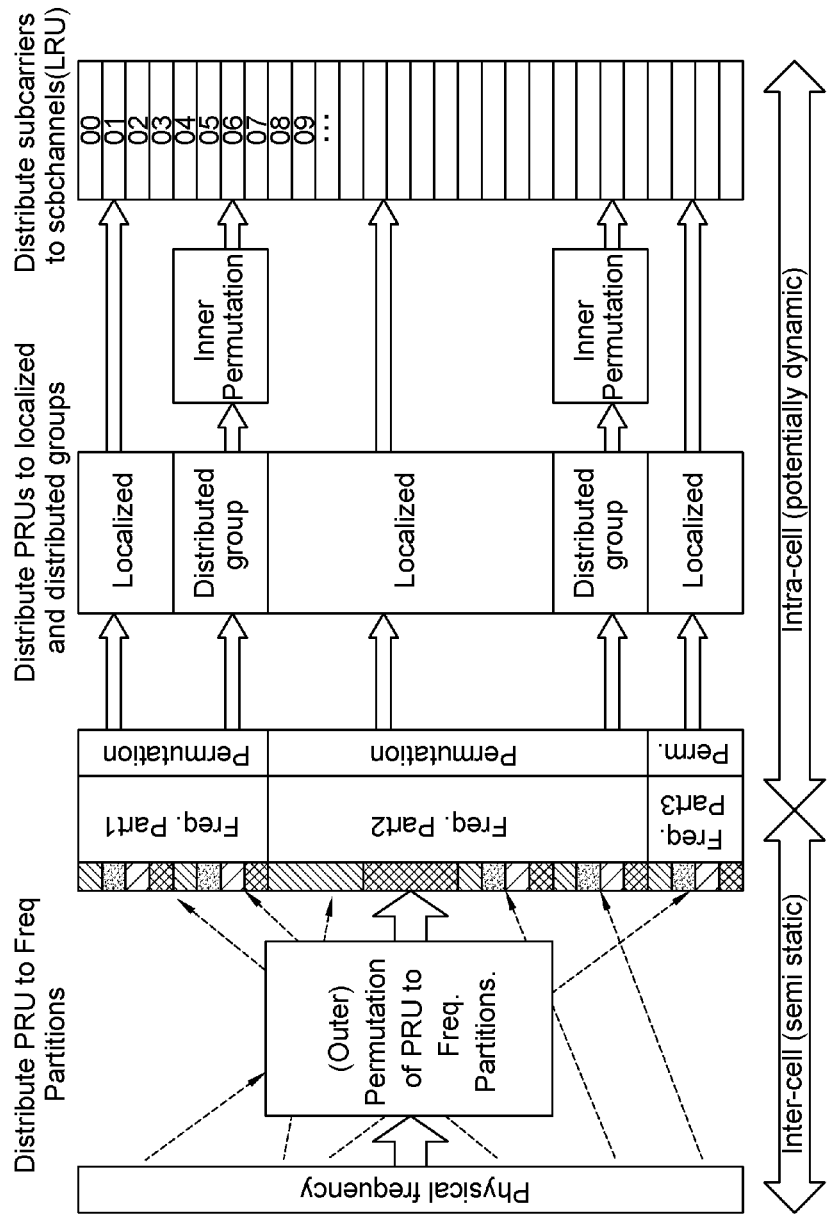
FIG. 5 shows an example of resource unit mapping.

FIG. 5 shows an example of resource unit mapping. A plurality of subcarriers on one OFDM symbol are divided into at least one PRU. Each PRU includes a pilot subcarrier and a data subcarrier.

Referring to FIG. 5, an outer permutation is applied to the PRU. The outer permutation is applied in a unit of at least one or more PRUs. Direct mapping of the outer permutation is supported by only the CRU.

In addition, a rearranged PRU is distributed over frequency partitions. The frequency partition is divided into a DRU and a CRU for each resource group. A sector-specific permutation may be supported. Direct mapping of resources may be supported for localized resources. A size of distributed/localized resource may be flexibly determined for each sector. Next, localized and distributed groups are mapped to the LRU.

An inner permutation is defined for distributed resource allocation in one frequency partition, and is used to spread subcarriers of the DRU throughout the entire distributed resource allocation. A granularity of the inner permutation is equal to a basic unit of constituting the DRU. If it is assumed that N LRUs exist in one distributed group, P permutation sequences are provided. Sub-channelization for a distributed resource allows subcarriers of the LRU to be spread with a full available bandwidth of the distributed resource. There is no inner permutation for localized resource allocation. The PRU is directly mapped to the CRU in each frequency partition.

Hereinafter, various embodiments of a proposed resource allocation method will be described.

<Resource Allocation Method>

Figure 6:
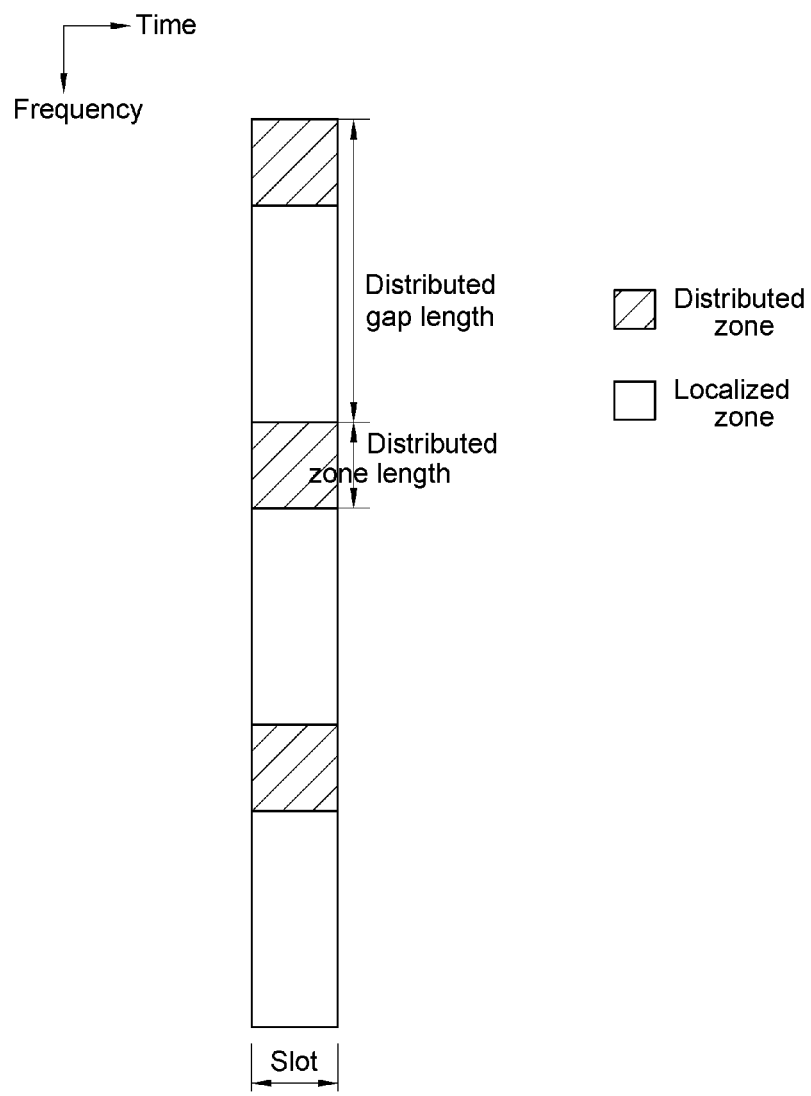
FIG. 6 is an exemplary diagram showing resource allocation according to an embodiment of the present invention.

FIG. 6 is an exemplary diagram showing resource allocation according to an embodiment of the present invention. An available frequency band includes a plurality of distributed zones and a plurality of localized zones. The available frequency band denotes a region that can be allocated for data transmission. The available frequency band may be a region in which a guard band and a direct current (DC) subcarrier are excluded from a full bandwidth. The distributed zone denotes a region that is distributively mapped on a physical plane. The localized zone denotes a region that is densely mapped on the physical plane. In the following description, a slot denotes a unit of allocating resources from a logical plane to a physical plane, and includes a plurality of OFDM symbols in a time domain and a plurality of subcarriers in a frequency domain. For example, the slot may be the PRU, and may also be referred to as a physical resource block (PRB) or a subchannel. A slot length may be equal to a subframe length. Alternatively, the slot length may be equal to a length of a plurality of subframes.

A distributed gap length denotes a length between two non-consecutive distributed zones. If distributed zones are separated with a specific interval and if one slot is divided along the time domain into subparts (to be described below) by the number of distributed zones, the distributed gap length can be obtained by (the number of available subcarriers/the number of subparts).

The distributed zones are uniformly distributed with the distributed gap length from a first slot in an available frequency band. A length of distributed zone may be determined according to a total amount of localized zones and a total amount of distributed zones. Therefore, the distributed gap length can be avoided from being changed even if a length of localized zone is changed. That is, even if a ratio between the localized zone and the distributed zone is changed according to allocated resources, the distributed gap length can be maintained to be constant by increasing or decreasing only the length of distributed zone.

FIG. 7 is an exemplary diagram showing subpart separation. A slot is divided into a plurality of subparts in a time domain. In the following description, Nd denotes the number of subparts included in one slot. The subpart denotes a basic unit of mapping from a logical plane to a physical plane. The subpart may consist of N OFDMA symbols×M subcarriers (N,M≥1). Although it is shown herein that one slot includes 6 OFDM symbols and the subpart includes 2 OFDM symbols, this is for exemplary purposes only. FIG. 7(A) shows a case where mapping is equally performed in a subpart unit from the logical plane to the physical plane. FIG. 7(B) shows a case where mapping is performed in a subpart unit from the logical plane to the physical plane according to a specific pattern. Herein, two OFDM symbols included in one subpart are separated by Nd in the physical plane.

Figure 8:
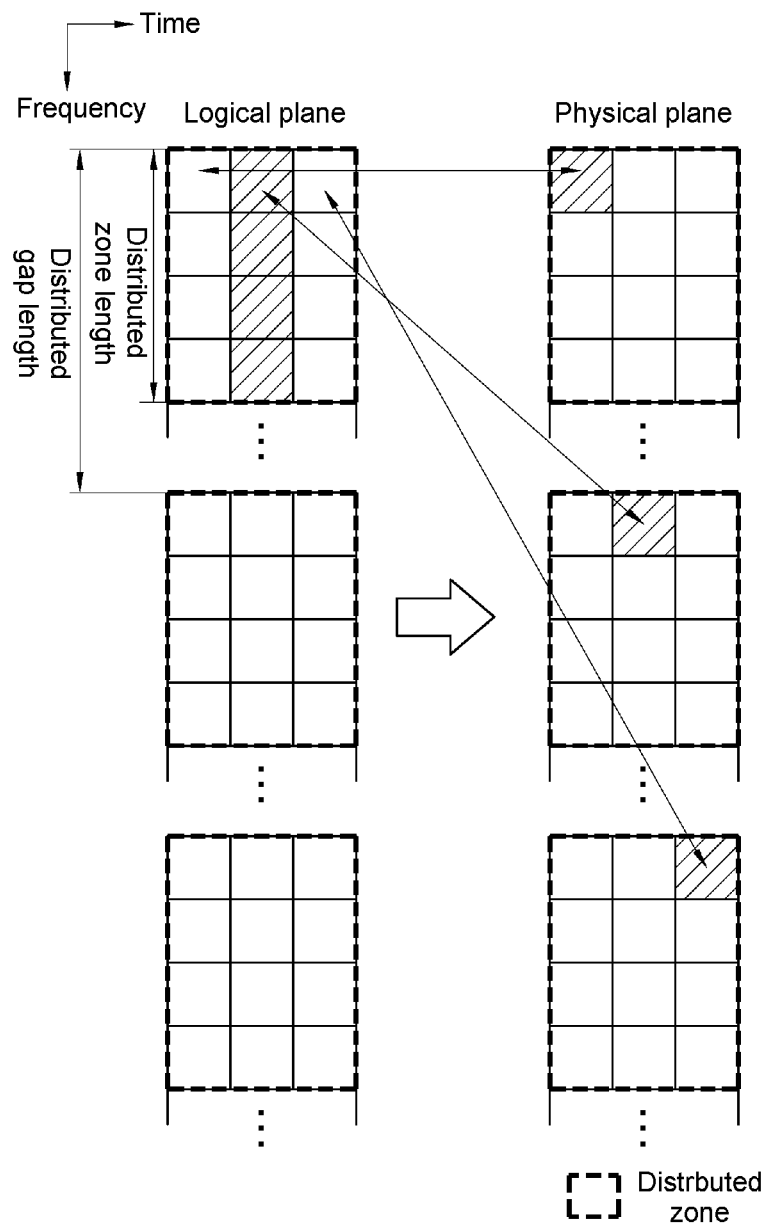
FIG. 8 is an exemplary diagram showing mapping for a distributed zone.

FIG. 8 is an exemplary diagram showing mapping for a distributed zone. The number Nd of subparts is set to be equal to the number of non-consecutive distributed zones. Each subpart belonging to a slot in the distributed zone of a logical plane can be mapped to the non-consecutive distributed zones on a physical plane. It is shown herein that, when three subparts exist (i.e., Nd=3), the subparts are respectively mapped to three different distributed zones on the physical plane.

Figure 9:
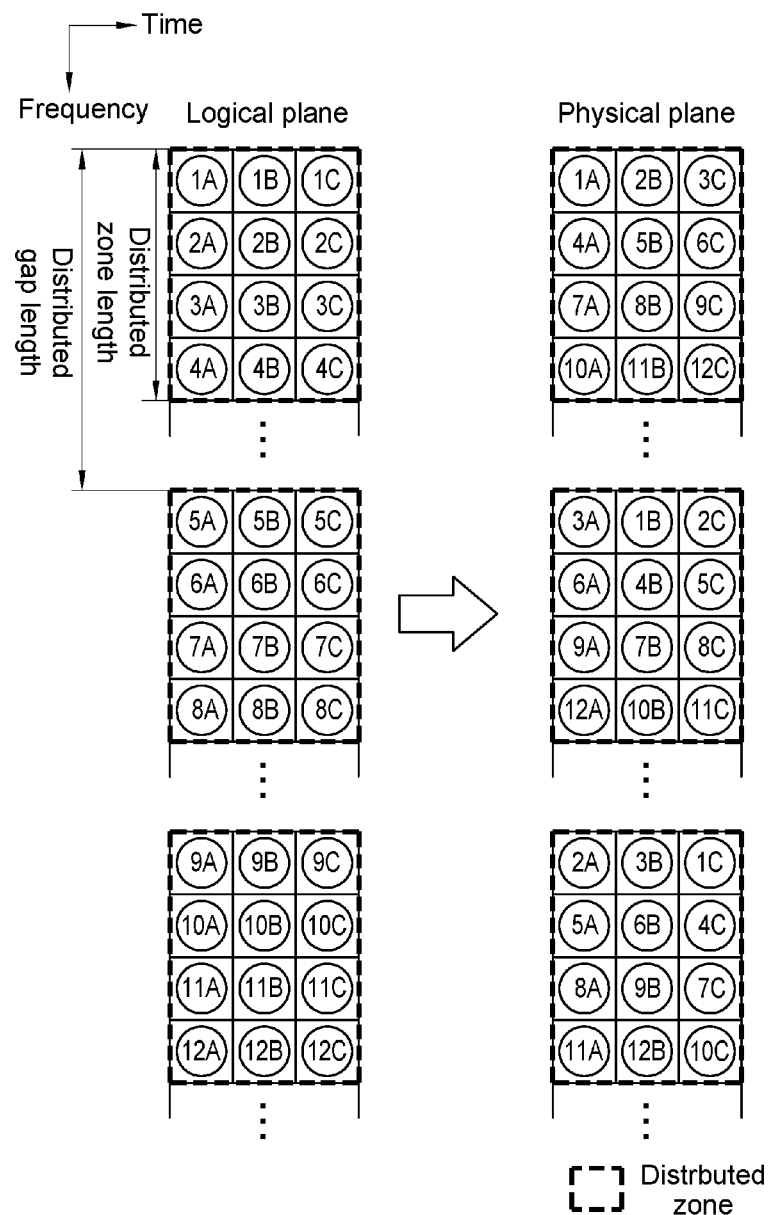
FIG. 9 is an exemplary diagram showing entire mapping for a distributed zone.

FIG. 9 is an exemplary diagram showing entire mapping for a distributed zone. A, B, and C respectively indicate a first subpart, a second subpart, and a third subpart in a logical plane, and each numerical number denotes a slot index. For example, 'sA' in the logical plane indicates an (s+1)-th slot belonging to the first subpart. The number Nd of subparts is set to be equal to the number of distributed zones. Each subpart belonging to a slot in the distributed zone of the logical plane can be mapped to non-consecutive distributed zones of a physical plane.

Subcarriers belonging to the same subpart in the logical plane can be mapped so that the subcarriers belong to the same subpart in the physical plane.

According to the aforementioned mapping method, if the number of subparts, the distributed zone length, and the distributed gap length are known to both a transmitter and a receiver, distributed resources can be allocated without signaling for an additional mapping method.

Figure 10:
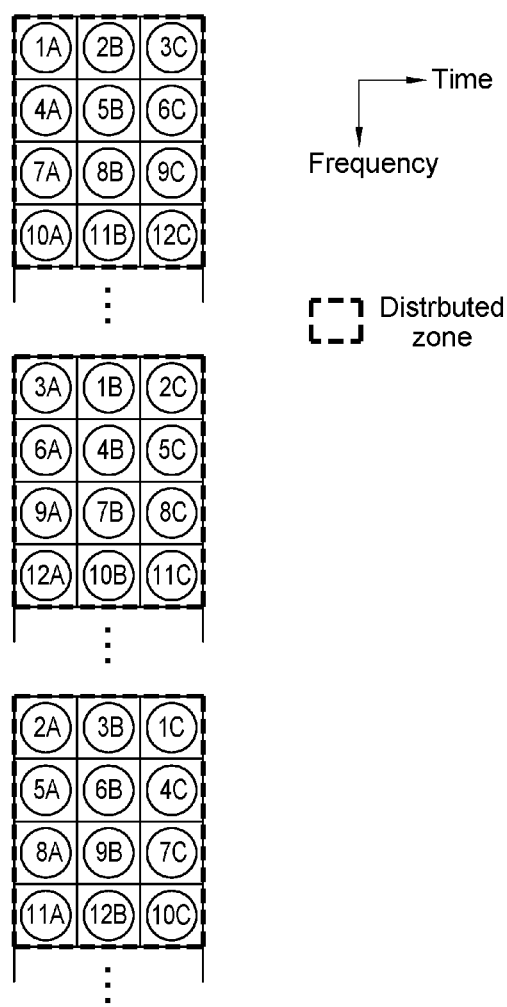
FIG. 10 is an exemplary diagram showing mapping for a distributed zone on a physical plane.

FIG. 10 is an exemplary diagram showing mapping for a distributed zone on a physical plane. In comparison with the embodiment of FIG. 9, each distributed zone on the physical plane is cyclically shifted in a unit of one or more subparts. Cyclic shift in a subpart unit may vary for each cell to reduce inter-cell interference. In addition, a different cyclic shift may be used in each distributed zone.

The distributed zones may be cyclically shifted in a slot unit. A cyclic shift unit may vary according to a cell identifier (ID), and a different cyclic shift may be used in each distributed zone.

The same slot structure is proposed without distinction of the distributed zone and the localized zone. When the distributed zone and the localized zone are allowed to be used together in one slot, flexibility of resource allocation can be guaranteed. The slot can be divided into a plurality of subparts in a time domain so that two subcarriers are paired in a frequency domain. Thus, space frequency block coding (SFBC) can be easily supported. The slot is a basic unit of resource allocation. When inter-cell synchronization is achieved, slot-unit synchronization is also achieved. Thus, there is no need to consider inter-cell interference that occurs when a permutation zone is misaligned. The inter-cell interference can be reduced by applying a cell-specific subpart unit and/or slot-unit cyclic shift in the distributed zone.

<Preferential Allocation of Localized Resource>

Hereinafter, a method capable of improving a channel selectivity gain by preferentially allocating a localized resource will be described.

Figure 11:
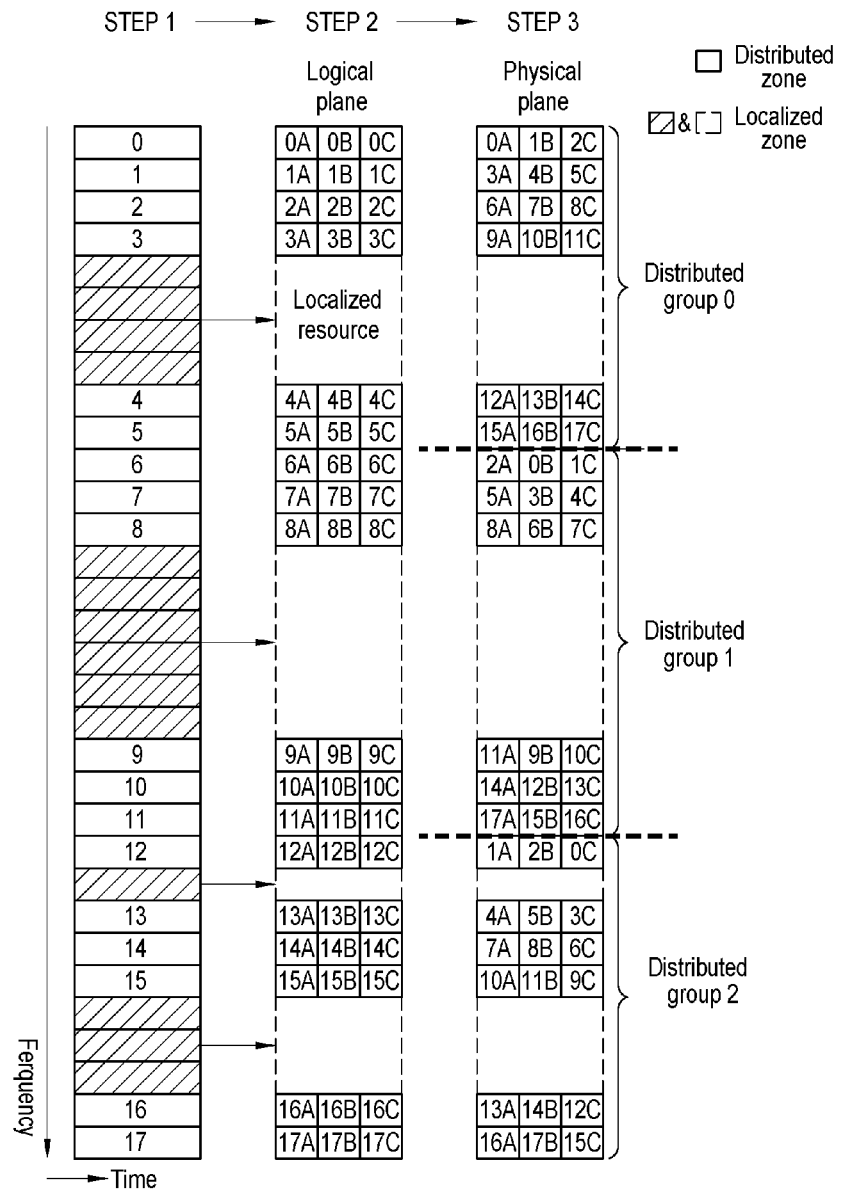
FIG. 11 is an exemplary diagram showing an example of a resource allocation method.

FIG. 11 is an exemplary diagram showing an example of a resource allocation method.

Referring to FIG. 11, in step 1, localized zones to be preferentially allocated in an available frequency band are specified. In addition, distributed zones are arranged so that the number of slots included in the distributed zones is a multiple of the number Nd of subparts.

In step 2, the localized zones are preferentially allocated in a logical plane, and a slot is divided into Nd subparts. A, B, and C respectively indicate a first subpart, a second subpart, and a third subpart, and each numerical number denotes a slot index. For example, 'sA' in the logical plane indicates an (s+1)-th slot belonging to the first subpart.

In step 3, an available frequency band is divided into Nd distributed groups. One distributed group includes slots corresponding to (the total number of slots/Nd). Herein, the total number of slots is 18, and a value of Nd is 3. Thus, one distributed group includes 6 slots. Each subpart constituting one slot on the logical plane can be mapped to a different subpart of a slot belonging to a different distributed group on the physical plane.

The number of distributed groups may be a multiple of the number of subparts (i.e., a multiple of Nd). In this case, mapping can be performed from the logical plane to the physical plane in a fractional manner.

Figure 12:
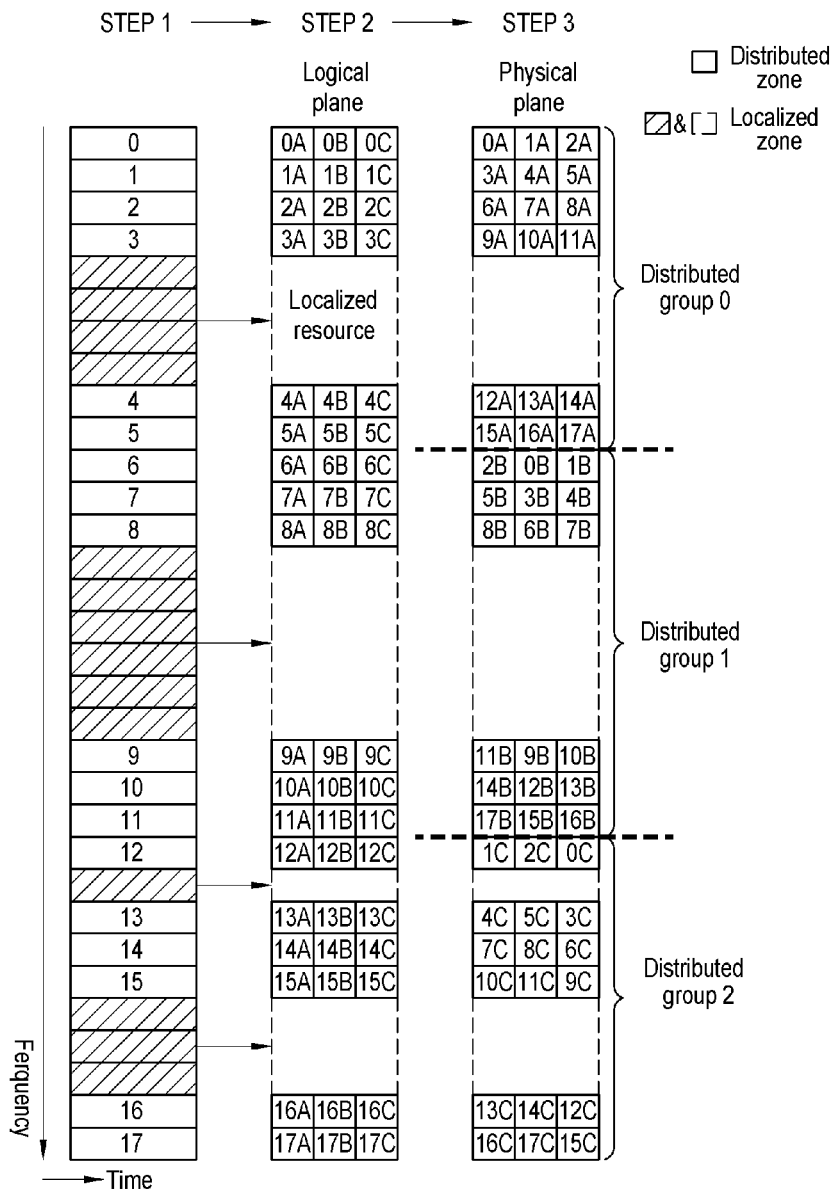
FIG. 12 is an exemplary diagram showing another example of a resource allocation method.

FIG. 12 is an exemplary diagram showing another example of a resource allocation method. In comparison with the embodiment of FIG. 11, FIG. 12 shows a case where each subpart includes the same number of slots in a frequency domain.

Referring to FIG. 12, in step 1, localized zones to be preferentially allocated in an available frequency band are specified. In addition, distributed zones are arranged so that the number of slots included in the distributed zones is a multiple of the number Nd of subparts.

In step 2, the localized zones are preferentially allocated in a logical plane, and a slot is divided into Nd subparts. Each subpart includes the same number of slots in a frequency domain. Herein, three subparts each include 18 slots.

In step 3, an available frequency band is divided into Nd distributed groups. One distributed group includes slots corresponding to (the total number of slots/Nd). Herein, the total number of slots is 18, and a value of Nd is 3. Thus, one distributed group includes 6 slots. Each subpart constituting one slot on the logical plane can be mapped to a different subpart of a slot belonging to a different distributed group on the physical plane. Since each subpart includes the same number of slots, the distributed zone on the physical plane includes slots corresponding to all distributed zones on the logical plane.

The number of distributed groups may be a multiple of the number of subparts (i.e., a multiple of Nd). In this case, mapping can be performed from the logical plane to the physical plane in a fractional manner.

Figure 13:
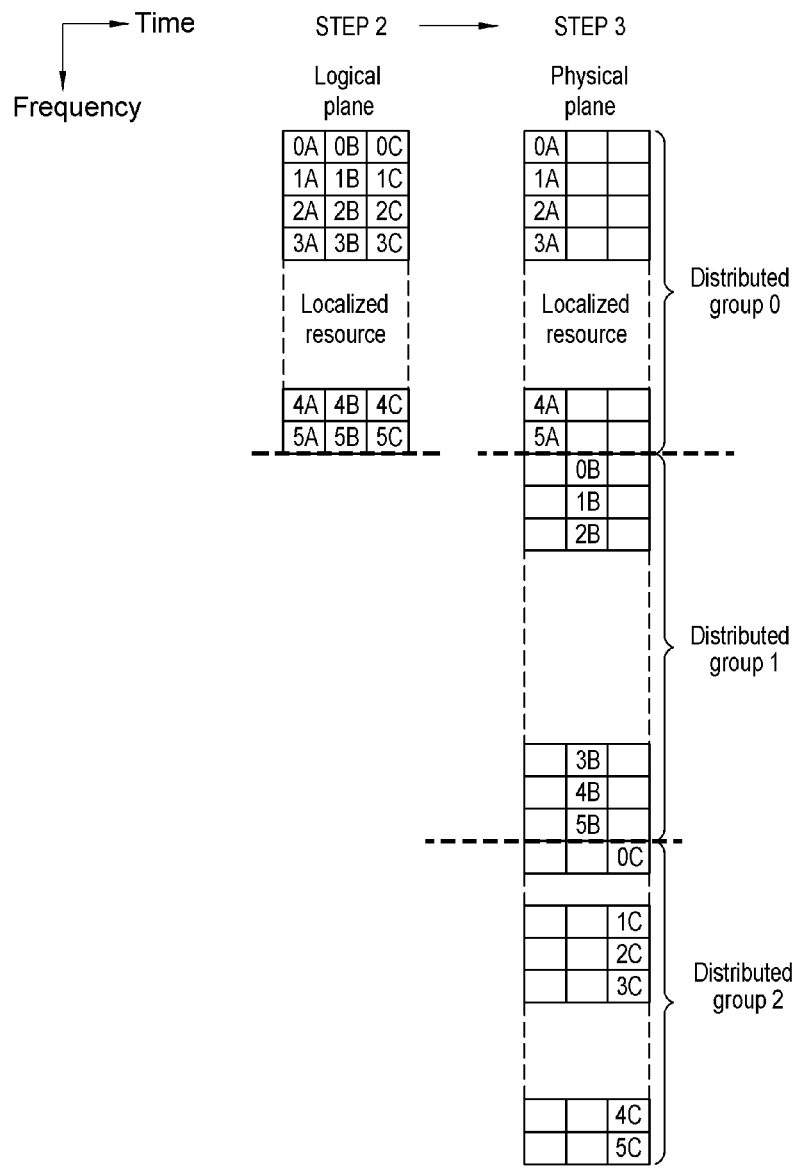
FIG. 13 is an exemplary diagram showing another example of a resource allocation method.

FIG. 13 is an exemplary diagram showing another example of a resource allocation method. A mapping granularity is chosen as a distributed group unit when mapping is achieved from a logical plane to a physical plane. That is, in comparison with the embodiment of FIG. 11 or FIG. 12, mapping is performed in the distributed group unit in FIG. 13. A mapping granularity may be a unit of a plurality of continuous or discontinuous subcarriers.

Mapping from the logical plane to the physical plane may be shifted in a distributed group unit in a cell unit. For example, a subpart 0A is mapped to a first slot of a first distributed group in a first cell, is mapped to a first slot of a second distributed group in a second cell, and is mapped to a first slot of a third distributed group in a third cell.

In addition, mapping from the logical plane to the physical plane may be shifted in a cell unit along a frequency domain. For example, a subpart 0A is mapped to a first slot of each distributed group in a first cell, is mapped to a second slot in each distributed group in a second cell, and is mapped to a third slot of each distributed group in a third cell. A shift unit may differ according to a cell ID. A distributed group shift and a frequency domain shift can be used in combination.

Figure 14:
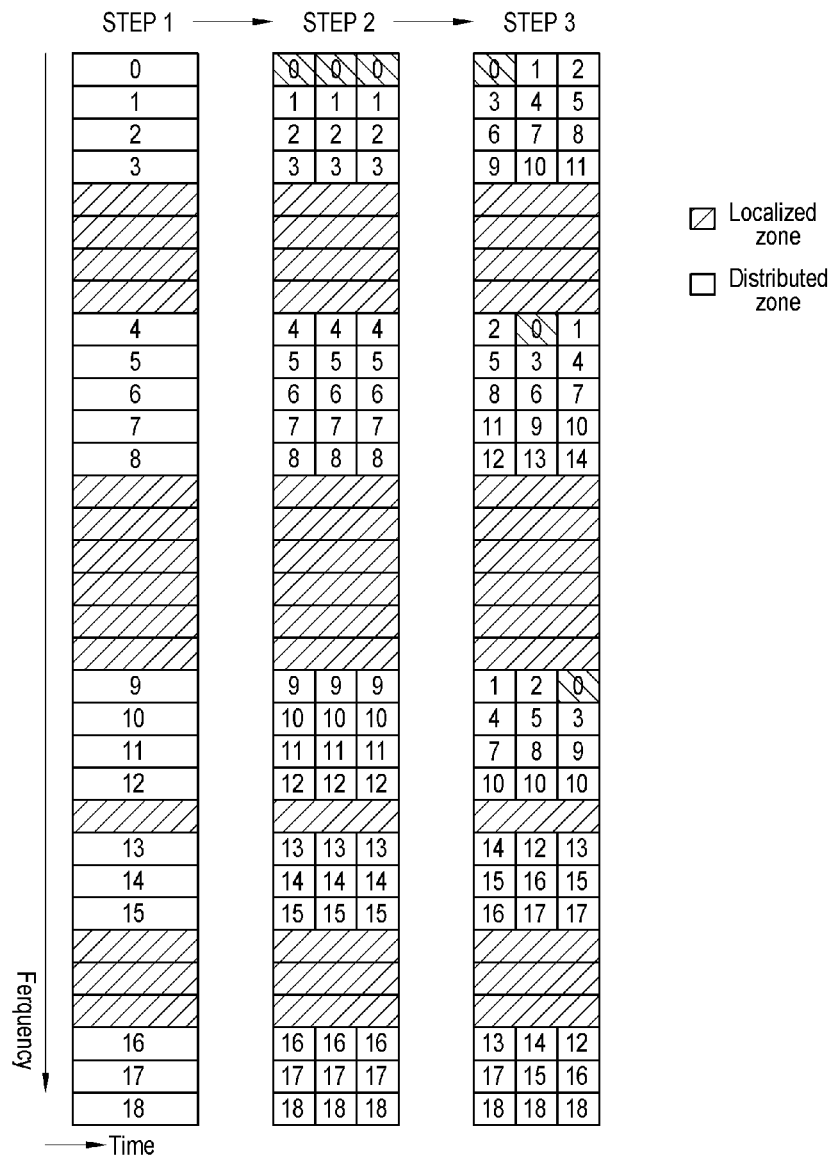
FIG. 14 is an exemplary diagram showing another example of a resource allocation method.

FIG. 14 is an exemplary diagram showing another example of a resource allocation method.

Referring to FIG. 14, in step 1, localized zones to be preferentially allocated in an available frequency band are specified. In addition, distributed zones are arranged so that the number of slots included in the distributed zones is a multiple of the number Nd of subparts.

In step 2, the localized zones are preferentially allocated in a logical plane, and a slot is divided into Nd subparts.

In step 3, each subpart constituting one slot on the logical plane is mapped to a subpart of a subsequent slot in a different localized zone on the physical plane. Therefore, each subpart is distributed between the preferentially allocated localized zones.

The same slot structure is proposed without distinction of the distributed zone and the localized zone. When the distributed zone and the localized zone are allowed to be used together in the same time domain, flexibility of resource allocation can be guaranteed. The slot can be divided into a plurality of subparts in a time domain so that two subcarriers are paired in a frequency domain. Thus, SFBC can be easily supported. The slot is a basic unit of resource allocation. When inter-cell synchronization is achieved, slot-unit synchronization is also achieved. Thus, there is no need to consider inter-cell interference that occurs when a permutation zone is misaligned. By preferentially allocating resources for the localized zone, a channel selectivity gain can be improved.

<Block-Based Resource Allocation>

A method of allocating resources in an OFDMA-based system operates in three modes, that is, a localized resource allocation mode, a distributed resource allocation mode, and a combination mode of the two modes. A method proposed hereinafter is provided to implement all of the three modes by using one mapping scheme.

Figure 15:
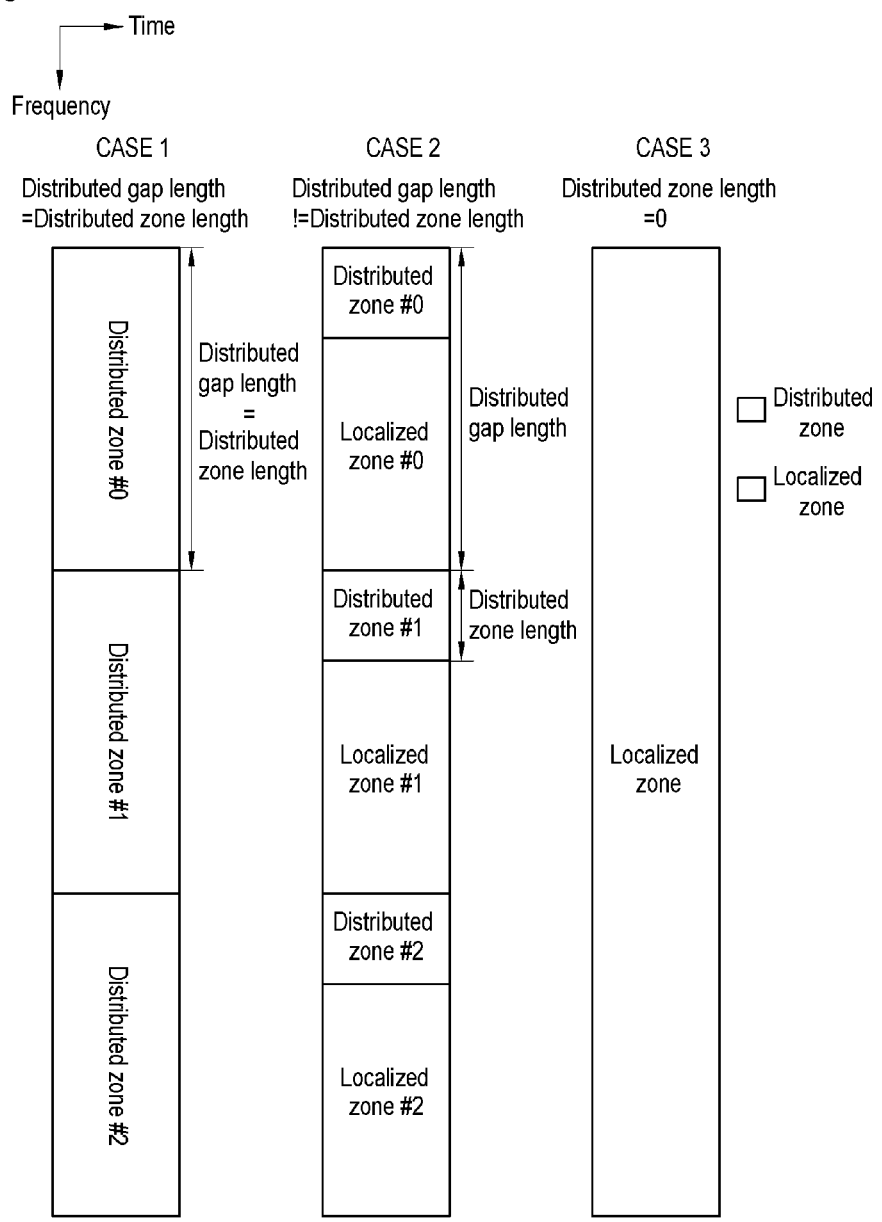
FIG. 15 shows resource allocation modes.

FIG. 15 shows resource allocation modes. In 'CASE 1', an available frequency band to be used is divided into at least one distributed zone, and a distributed gap length is equal to a distributed zone length. In 'CASE 2', the available frequency band is divided into a distributed zone and a localized zone. The distributed gap length is (the number of subcarriers in the available frequency band/Nd). In 'CASE 3', the available frequency band is used as the localized zone.

Figure 16:
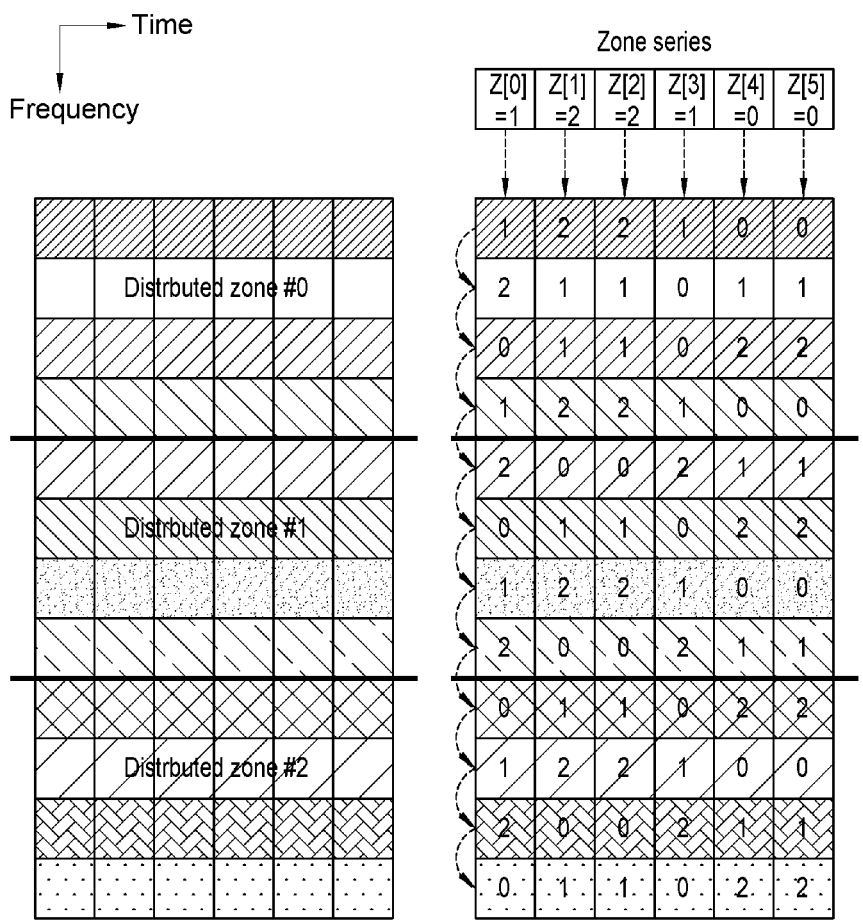
FIG. 16 is an exemplary diagram for defining a zone series.

FIG. 16 is an exemplary diagram for defining a zone series. There are three distributed zones #0, #1, and #2. Each distributed zone includes four slots. Each slot consists of six OFDM symbols and at least one subcarrier. Therefore, a distributed zone length $N_{slot\_per\_zone}$ is 4, and the number $N_{zone}$ of distributed zones is 3. A zone series for an (s+1)-th slot is defined as $Z_s=\{Z_s[0], Z_s[1], \ldots, Z_s[N_{slot}-1]\}$ where $N_{slot}$ is the number of OFDM symbols included in one slot. Each element of the zone series indicates an index of a distributed zone to which a corresponding OFDM symbol is mapped. Therefore, $0 \leq Z_s[n] < N_{zone}$. Any basis sequence is initially defined as the zone series. Herein, $Z_0=\{1, 2, 2, 1, 0, 0\}$. An initial zone series $Z_0$ is assigned to a first slot.

The zone series is defined for subsequent slots according to the following equation:

MathFigure 1

$$Z_{s+1}[n] = Z_s[n] \bmod N_{zone} \qquad \text{[Math.1]}$$

where 'mod' denotes a modulo operation, n denotes an OFDM symbol index, s denotes a slot index, and $N_{zone}$ denotes the number of distributed zones.

The number of distributed zones, the number of slots included in the distributed zone, the number of OFDM symbols included in a slot, and the initial zone series are shown for exemplary purposes only, and thus the technical features of the present invention are not limited thereto.

Each element of the zone series may also be defined for a plurality of OFDM symbols. That is, a slot may be divided into a plurality of sub-groups consisting of a plurality of OFDM symbols, and an element of one zone series may correspond to each sub-group.

Figure 17:
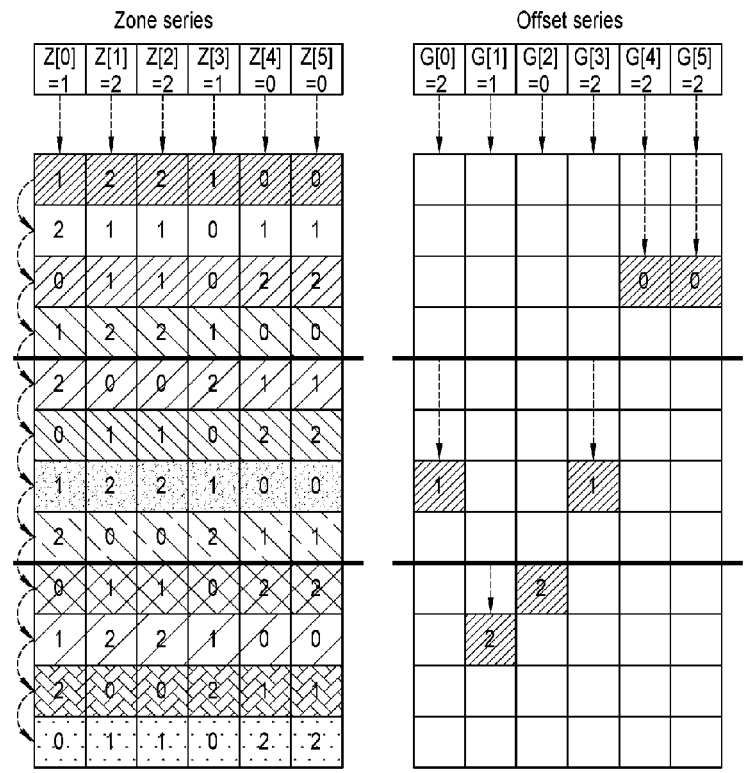
FIG. 17 is an exemplary diagram for showing an offset series.

FIG. 17 is an exemplary diagram for showing an offset series. An offset series for an (s+1)-th slot is defined as $G_s=\{G_s[0], G_s[1], \ldots, G_s[N_{slot}-1]\}$ where Nslot is the number of OFDM symbols included in one slot. Each element of the offset series indicates an offset of a slot in a distributed zone to which a corresponding OFDM symbol is mapped. Therefore, $0 \leq G_s[n] < N_{slot\_per\_zone}$. Any basis sequence is initially defined as the offset series. Herein, $G_0=\{2, 1, 0, 2, 2, 2\}$. The initial zone series $G_0$ is assigned to a first slot.

A first slot in a first distributed zone will be taken as an example. Since a zone series is $Z_0=\{1, 2, 2, 1, 0, 0\}$, a first OFDM symbol is mapped to a distributed zone #1, a second OFDM symbol is mapped to a distributed zone #2, a third OFDM symbol is mapped to the distributed zone #2, a fourth OFDM symbol is mapped to the distributed zone #1, a fifth OFDM symbol is mapped to a distributed zone #0, and a sixth OFDM symbol is mapped to the distributed zone #0. In this case, a slot offset in each distributed zone is represented with an offset series. That is, since an offset series for the first slot is $G_0=\{2, 1, 0, 2, 2, 2\}$, the first OFDM symbol mapped to the distributed zone #1 is mapped to a third slot, the second OFDM symbol mapped to the distributed zone #2 is mapped to a second slot, the third OFDM symbol mapped to the distributed zone #2 is mapped to the first slot, the fourth OFDM symbol mapped to the distributed zone #2 is mapped to the third slot, the fifth OFDM symbol mapped to the distributed zone #0 is mapped to the third slot, and the sixth OFDM symbol mapped to the distributed zone #0 is mapped to the third slot.

An offset series for subsequent slots is defined according to the following equation.

MathFigure 2

$$G_{s+1}[n] = \left\{G_s[n] + floor\left(\frac{s+1}{N_{zone}-1}\right)\right\} \bmod N_{slot\_per\_zone} \qquad \text{[Math. 2]}$$

Herein, 'mod' denotes a modulo operation, floor(x) denotes a greatest integer less than x, n denotes an OFDM symbol index, s denotes a slot index, and $N_{slot\_per\_zone}$ denotes the number of slots included in one distributed zone. According to the above equation, when an offset series for a first slot is $G_0=\{2, 1, 0, 2, 2, 2\}$, an offset series for a second slot is $G_1=\{3, 2, 1, 3, 3, 3\}$, an offset series for a third slot is $G_2=\{3, 2, 1, 3, 3, 3\}$, and an offset series for a fourth slot is $G_3=\{4, 3, 2, 4, 4, 4\}$.

Figure 18:
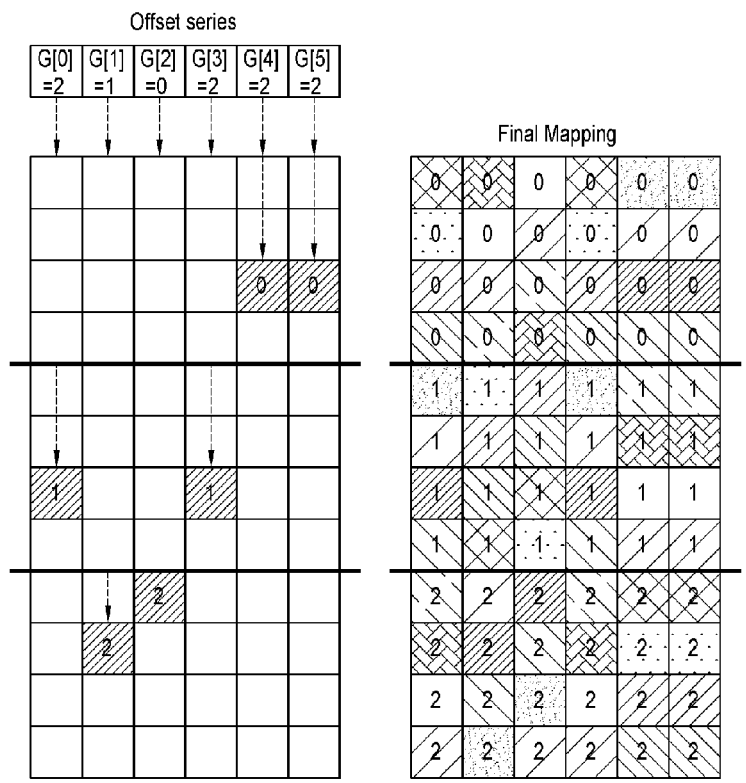
FIG. 18 shows a result of applying a zone series and an offset series to all slots.

FIG. 18 shows a result of applying a zone series and an offset series to all slots. In this case, a mapping rule SLOT(s+1, n) for an n-th OFDM symbol in a slot having an index of 's' can be expressed by the following equation.

MathFigure 3

$$Z_{s+1}[n] = N_{slot\_per\_zone} \cdot \{Z_s[n] \bmod N_{zone} G_{s+1}[n]\} + \left\{G_s[n] + floor\left(\frac{s+1}{N_{zone}-1}\right)\right\} \bmod N_{slot\_per\_zone} \qquad \text{[Math. 3]}$$

Figure 19:
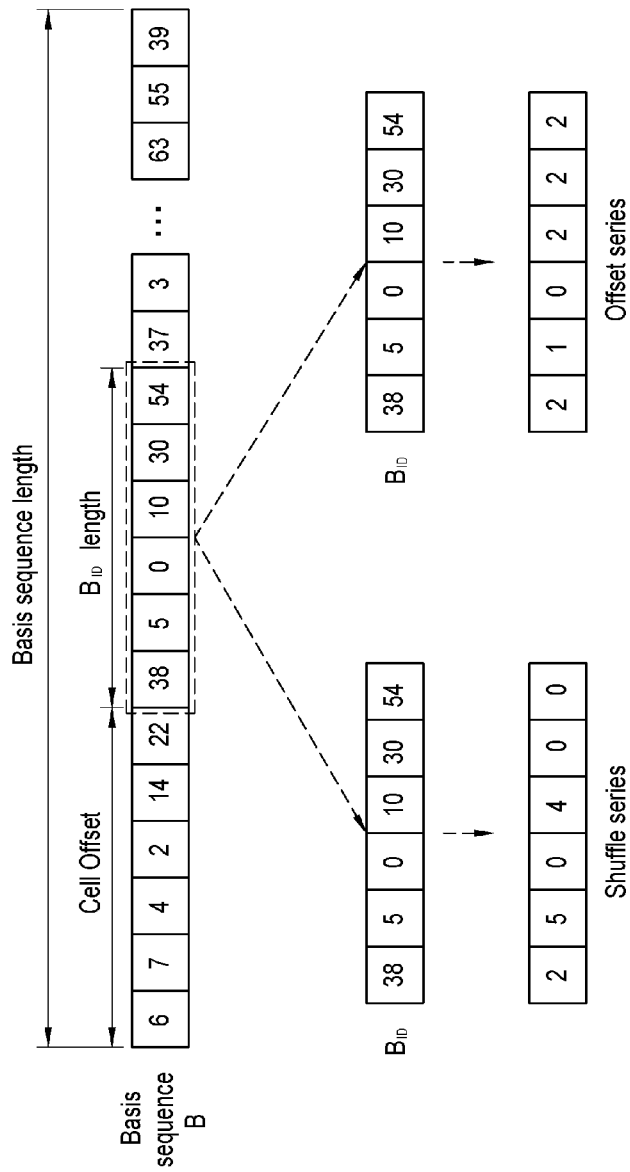
FIG. 19 is an exemplary diagram showing a method of obtaining a unique offset series for each cell.

FIG. 19 is an exemplary diagram showing a method of obtaining a unique offset series for each cell. If an offset series is defined with a cell-specific sequence, inter-cell interference can be reduced. A basis sequence having a specific length will be considered. Herein, a sequence B having a length of 64 is taken as an example of the basis sequence, where the sequence
B={6,7,4,2,14,22,38,5,0,10,30,54,37,3,12,18,46,21,32,9,24, 58,61,51,47,23,36,1,8,26,62, 53,35,15,20,34,13,16,42,29,48,41,27,60,49,43,31,52,33, 11,28,50,45,19,44,17,40,25, 56,57,59,63,55,39}.

An intermediary series BID having a length of $N_{slot}$ is defined according to an element that is shifted by an offset defined by a cell ID from the basis sequence. Herein, if an offset obtained from the cell ID is 6 and if $N_{slot}=6$, the intermediary series is $B_{ID}=\{38,5,0,10,30,54\}$. The offset series can be obtained according to the following equation.

MathFigure 4

$$G[n] = B_{ID}[n] \bmod N_{slot\_per\_zone} \qquad \text{[Math.4]}$$

Herein, $N_{slot\_per\_zone}$ denotes the number of slots included in one distributed zone. For example, if $N_{slot\_per\_zone}=4$, G={2, 1, 0, 2, 2, 2}.

Now, a method of obtaining a cell-specific zone series will be described. A shuffle series S can be defined from the aforementioned intermediary series according to the following equation.

MathFigure 5

$$S[n] = B_{ID} \mod N_{slot} \quad \text{[Math.5]}$$

Herein, $N_{slot}$ denotes the number of OFDM symbols included in one slot. For example, if $B_{ID}=\{38,5,0,10,30,54\}$ and $N_{slot}=6$, then $S=\{2, 5, 0, 4, 0, 0\}$.

Figure 20:
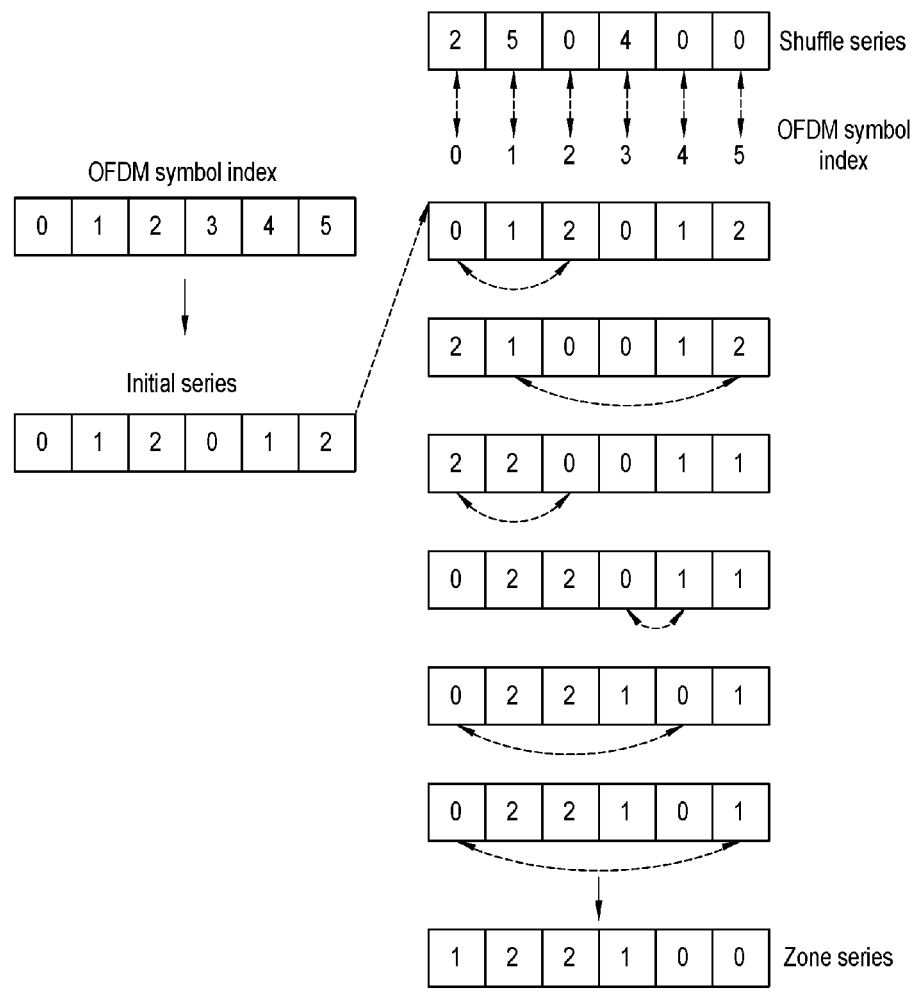
FIG. 20 is an exemplary diagram showing a method of obtaining a zone series.

FIG. 20 is an exemplary diagram showing a method of obtaining a zone series. If $N_{slot}=6$, an initial series I is defined as follows.

MathFigure 6

$$I[n] = n \mod Nd \quad \text{[Math.6]}$$

Herein, n denotes an OFDM symbol index, and Nd denotes the number of subparts. In a time domain, a slot can be divided into Nd subparts, and each subpart includes at least one OFDM symbol. If $Nd=3$, $I=\{0, 1, 2, 0, 1, 2\}$.

A unique zone sequence for each cell is obtained from an initial sequence by using a shuffle sequence S. The shuffle sequence represents swapping of each element of the initial sequence. If the shuffle sequence is $S=\{2, 5, 0, 4, 0, 0\}$, I[0] and I[2] are swapped. In addition, I[1] and I[5] are swapped. Subsequently, I[2] and I[0] are swapped, I[3] and I[4] are swapped, I[4] and I[0] are swapped, and I[5] and I[0] are swapped. As a result, a cell-specific zone series $Z=\{1, 2, 2, 1, 0, 0\}$ is obtained.

Figure 21:
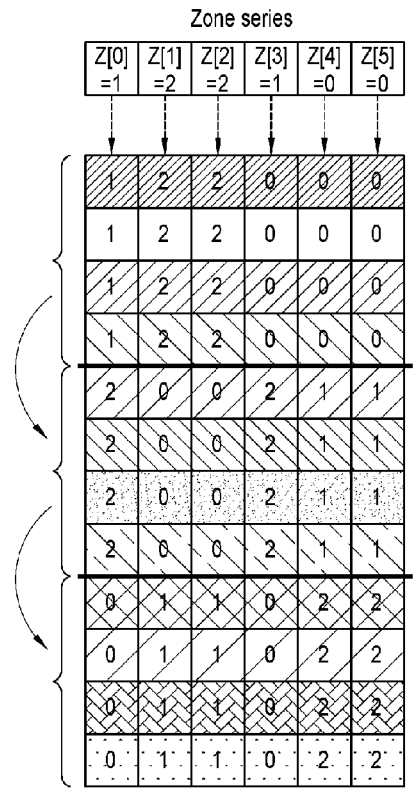
FIG. 21 shows another example of a zone series.

FIG. 21 shows another example of a zone series. In the aforementioned Equation 1, a granularity of the zone series is a slot unit. In compassion thereto, FIG. 21 shows a case where the granularity of the zone series is a distributed zone unit. That is, the same zone series is used in the same distributed zone.

The granularity of the zone series can be used variously. The zone series may be shifted in a subcarrier unit or may be shifted in a unit of a plurality of subcarriers.

Figure 22:
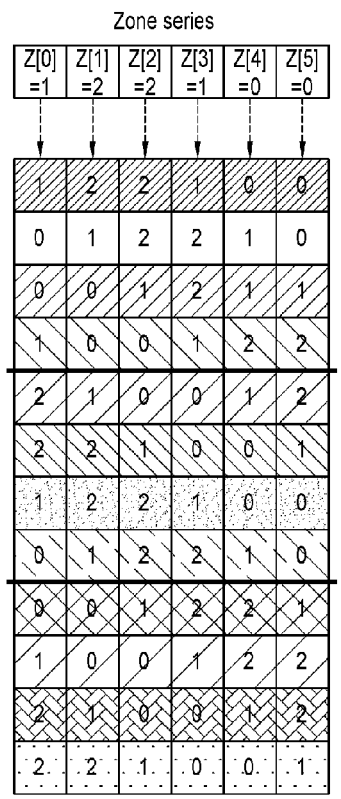
FIG. 22 shows another example of a zone series.

FIG. 22 shows another example of a zone series. The zone series is shifted for each slot in an OFDM symbol unit. Although the zone series is cyclically shifted in a unit of one OFDM symbol herein, the zone series may be shifted in a unit of a plurality of OFDM symbols. For another example, the zone series may be shifted in an OFDM symbol unit for each distributed zone.

Figure 23:
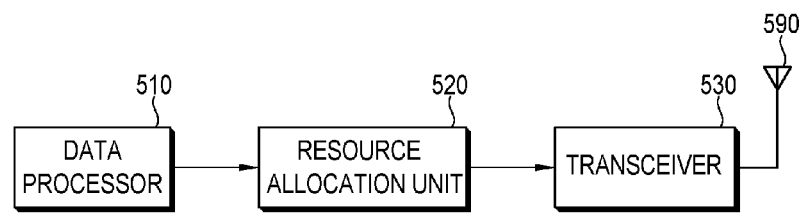
FIG. 23 is a block diagram showing an apparatus for wireless communication according to an embodiment of the present invention.

FIG. 23 is a block diagram showing an apparatus for wireless communication according to an embodiment of the present invention. The apparatus for wireless communication may be a part of a UE or may be a part of a BS. The apparatus for wireless communication includes a data processor 510, a resource allocation unit 520, a transceiver 530, and an antenna 590. The data processor 510 processes information bits. The resource allocation unit 520 allocates resources for data transmission. The aforementioned resource allocation method can be implemented by the resource allocation unit 520. For this, the resource allocation unit 520 may perform resource mapping from a logical plane to a physical plane. Further, for data reception, the resource allocation unit 520 may perform mapping from the physical plane to the logical plane. The transceiver 530 converts data into a radio signal, and transmits the radio signal by using an allocated resource. Alternatively, the transceiver 530 may receive the radio signal by using the allocation resource.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of allocating resources in a wireless communication system, the method comprising:
dividing an available frequency band into at least one into a distributed zone and at least one localized zone on a logical plane;
dividing the at least one distributed zone on the logical plane into a plurality of subparts in time domain; and
mapping the at least one distributed zone and the at least one localized zone on the logical plane into at least one distributed zone and at least one localized zone, respectively, on a physical plane, wherein the plurality of subparts included in the at least distributed zone on the logical plane are distributed to non-consecutive distributed zones across the at least one localized zone on the physical plane in both a frequency domain and the time domain while the at least one localized zone on the logical plane is not distributed on the physical plane in the time domain.

2. The method of claim 1, wherein the at least one localized zone is mapped to the same resource on the logical plane and the physical plane.

3. The method of claim 1, wherein each subpart is mapped to a different distributed group on the physical plane, and the distributed group comprises at least one distributed zone and at least one localized zone.

4. The method of claim 3, wherein the number of subparts is equal to the number of distributed groups or is a multiple of the number of distributed groups.

5. The method of claim 1, wherein mapping to the physical plane is performed based on a zone series indicating to which distributed zone each subpart is mapped.

6. The method of claim 5, wherein the zone series is unique for each cell.

7. The method of claim 5, wherein the zone series is changed in a slot unit.

8. The method of claim 5, wherein mapping from the logical plane to the physical plane is performed based on an offset series indicating to which slot the mapping is achieved on the distributed zone.

9. The method of claim 7, wherein the offset series is changed in a slot unit.

10. The method of claim 7, wherein the offset series is unique for each cell.

* * * * *